United States Patent [19]
Paya

[11] Patent Number: 5,630,681
[45] Date of Patent: May 20, 1997

[54] CUTTING INSERT WITH PERPENDICULAR RIDGES HAVING TRANSVERSE RIBS FOR CHIP GUIDING

[75] Inventor: José A. Paya, Mühlheim, Germany

[73] Assignee: Widia GmbH, Essen, Germany

[21] Appl. No.: 424,344

[22] PCT Filed: Nov. 18, 1993

[86] PCT No.: PCT/DE93/01110

§ 371 Date: Apr. 18, 1995

§ 102(e) Date: Apr. 18, 1995

[87] PCT Pub. No.: WO94/12304

PCT Pub. Date: Jun. 9, 1994

[30] Foreign Application Priority Data

Nov. 21, 1992 [DE] Germany ............ 42 39 235.7

[51] Int. Cl.[6] .................................................. B23B 27/22
[52] U.S. Cl. ................................... 407/114; 407/116
[58] Field of Search ............................. 407/114–116

[56] References Cited

FOREIGN PATENT DOCUMENTS

| | | |
|---|---|---|
| 0 181 844 | 5/1986 | European Pat. Off. . |
| 0 360 774 | 3/1990 | European Pat. Off. . |
| 0 491 670 A3 | 6/1992 | European Pat. Off. . |
| 1520293 | 4/1968 | France . |
| 2475438 | 8/1981 | France . |
| 22 31 631 C2 | 2/1973 | Germany . |
| 28 45 211 A1 | 4/1979 | Germany . |
| 40 18 043 A1 | 12/1991 | Germany . |
| 41 18 065 A1 | 12/1992 | Germany . |

OTHER PUBLICATIONS

Metalworking Production Jun. 1992, No. 7, No. 355.

*Primary Examiner*—M. Rachuba
*Assistant Examiner*—Kenneth J. Hansen
*Attorney, Agent, or Firm*—Herbert Dubno; Andrew Wilford

[57] ABSTRACT

The invention relates to a cutting insert (20) with at least one chip guiding groove (25) in which there are longitudinal ribs (27) running substantially perpendicularly to the cutting edge (22) and bridging at least partially the chip guide groove(s) with additional chip guide components (28–42) transversely to the longitudinal rib axis.

27 Claims, 9 Drawing Sheets

CUTTING INSERT WITH PERPENDICULAR RIDGES HAVING TRANSVERSE RIBS FOR CHIP GUIDING

CROSS REFERENCE TO RELATED APPLICATIONS

This application is the US national phase of PCT application PCT/DE93/01110 filed 18 Nov. 1993 with a claim to the priority of German application P 42 39 235.7 itself filed 21 Nov. 1992.

FIELD OF THE INVENTION

The invention relates to a cutting insert with at least one chip-breaking groove arranged in raised chip-forming elements.

BACKGROUND OF THE INVENTION

German patent document 1,602,864 suggests for better guiding and breaking of the moving chip over a greater machining region to form the cutting edge between the cutting surfaces as a concave arc and to leave the inner flanks of the chip-breaking groove steep to the respective overlying surface (plateau) of the cutting insert.

German patent document 2,544,991 describes a cutting insert that has more than two terraced chip-breaking steps along the cutting edge with each step edge having a longitudinally wavy edge. With this embodiment it is possible in another way to avoid a long helical chip with the last cutting insert in that optimally many and differently directed chip-deforming pressures are effective over the entire chip width so that same is deformed crosswise and transversely. In this above-cited embodiment the stated goal of making short chips is only unsatisfactorily obtained. From European patent documents 0,168,556 and 0,222,317 cutting inserts are known having a chamfer along the cutting edge and parallel to the cutting edge and chamfer a chip-guiding groove and a raised central part substantially above the chamfer and with ball-segment projections provided on the ascending flank to the raised central part. German patent document 3,431,601 describes a cutting insert with a first cylindrical chip-guiding groove of uniform width and a second cylindrical chip-guiding groove which is of greater width but lesser depth than the first groove.

The cutting insert according to European patent document 0,414,241 has recesses not only on the free surface but also on the cutting surface and which merge with one another in the region of the cutting edge so that the cutting edge is set back in the region of the recesses relative to the remaining parts of the cutting edge. The respective trapezoidal shape is made with sharp edges so that one cannot count on a long service life. In addition as always friction is very great on the cutting surface during chip removal. Disadvantageously the cutting insert in the named publication is only usable in specialized applications.

In order to ensure good chip formation even with widely varying rates of advance, cut depths, or advance speeds it has been suggested further in European patent publication 0,278,083 to provide a cutting angle of more than 30° in the region extending on the chamfer at a right angle to the cutting edge so that the cutting angle is smaller with increased spacing from the chamfer and there is provided in the cutting surface region of the cutter body between the cutting-corner regions cutting ridges projecting out of the cutting surface and extending in the cutting direction and between which further bumps with run-on ramps are provided. The corners have three adjacent burred bumps which flank and extend parallel to the ridges.

European patent document 0,143,758 has longitudinally extending ridges which are trapezoidal in section and which run parallel to the cutting edge. These ridges are interrupted by recesses.

OBJECT OF THE INVENTION

It is an object of the present invention to provide a cutting insert, in particular an indexable cutting insert, which is usable at small and large advance speeds and cut depths and which maintains friction with the chip as low as possible to avoid premature wear and the occurrence of unwanted side effects as, e.g., vibration caused by dynamic forces in order to produce a smooth cut.

SUMMARY OF THE INVENTION

This object is achieved by the cutting insert with at least one chip-guiding groove in which raised chip-shaping elements are arranged and whose novelty is that longitudinal ridges are provided that are directed generally perpendicular to the cutting edge, that at least partly bridge over the chip-guiding groove or grooves, and that have additional chip-guiding elements transverse to the longitudinal-ridge axis. The advantage of this cutting insert is that the longitudinal ridges serve for forming the chip which takes place plastically so that as the chip slides over the ridges it is formed with a groove that stiffens it and makes it easier to break. In addition further chip-guiding elements are provided which further guide the chip so that the contact region between the chip and the cutting surface is minimized to reduce friction and ensure good cooling during use.

A chamfer is provided between the cutting edge and the chip-guiding groove, preferably along the cutting edge and having a uniform width. This chamfer serves for stabilizing the cutting edge.

Preferably the longitudinal ridge extends from the cutting edge or the chamfer to the central part. This way the chip-guiding groove or grooves is bridged so that there is the greatest possible plastic transverse deformation of the passing chip.

The longitudinal-ridge comb, which can either be flat or pointed, can be of different shapes seen in longitudinal section, preferably convex, concave, or wavy or generally straight, with the longitudinal ridge preferably ending in the region of the chamfer or in the descending flank of the first chip-guiding step and at its rear end away from the cutting edge in the edge of the central plateau or in the region of the ascending flank. The two described run-on regions define the connecting line for the longitudinal-ridge comb.

Seen in top view the longitudinal ridge has a side contour that is rectangular, trapezoidal, conical, hook-shaped, columnar, pointed, three-edge sword-shaped, and/or inset in the middle or wavy. Preferably the longitudinal ridge is pointed toward the cutting edge so that as the chip advances another deformation is ensured. The longitudinal ridge has a laterally arcuately dropping flank, in particular shaped convex, concave, or wavy. The ridge has on its top a burr-shaped, planar, and/or central slight recess.

The longitudinal ridges and the chip-guiding elements can be used with cutting inserts with a raised planar middle part (plateau) and with a recessed planar middle part. Correspondingly the longitudinal ridge has a rising connecting line or a generally falling connecting line, with the latter preferably formed arcuately convex.

The chip-guiding elements are transverse to the longitudinal ridge and have at most the same height and preferably two or more chip-guiding elements are arranged parallel to the longitudinal-ridge axis parallel one behind the other. The chip-guiding elements further from the cutting edge should be larger than the chip-guiding elements closer to the cutting edge so that different cutting depths during chip removal can be taken into account. Basically the chip-guiding elements should extend in both transverse directions from the longitudinal grooves these chip-guiding elements having simple shapes such as quarters of rotation ellipsoids, shovel-shaped, ball-segment shapes, convex dropping trapezoidal shapes to more complex shapes with terraced construction in convex, concave, or wavy shape as described in the following description of the embodiments.

BRIEF DESCRIPTION OF THE DRAWINGS

Embodiments of the invention are shown in the drawing. There is shown in:

FIGS. 2a through 2h top views of differently shaped longitudinal ridges;

FIG. 6b the view corresponding to X in FIG. 6a;

FIG. 7b a perspective enlarged section through a chip formed according to FIG. 7a;

SPECIFIC DESCRIPTION

Polygonal cutting inserts, generally triangular or quadrilateral cutting inserts, are basically known from the prior art. Cutting inserts according to the invention have at least one chip-guiding groove, longitudinal ridges at least partially formed therein, and chip-guiding elements transverse thereto.

Figure 1:
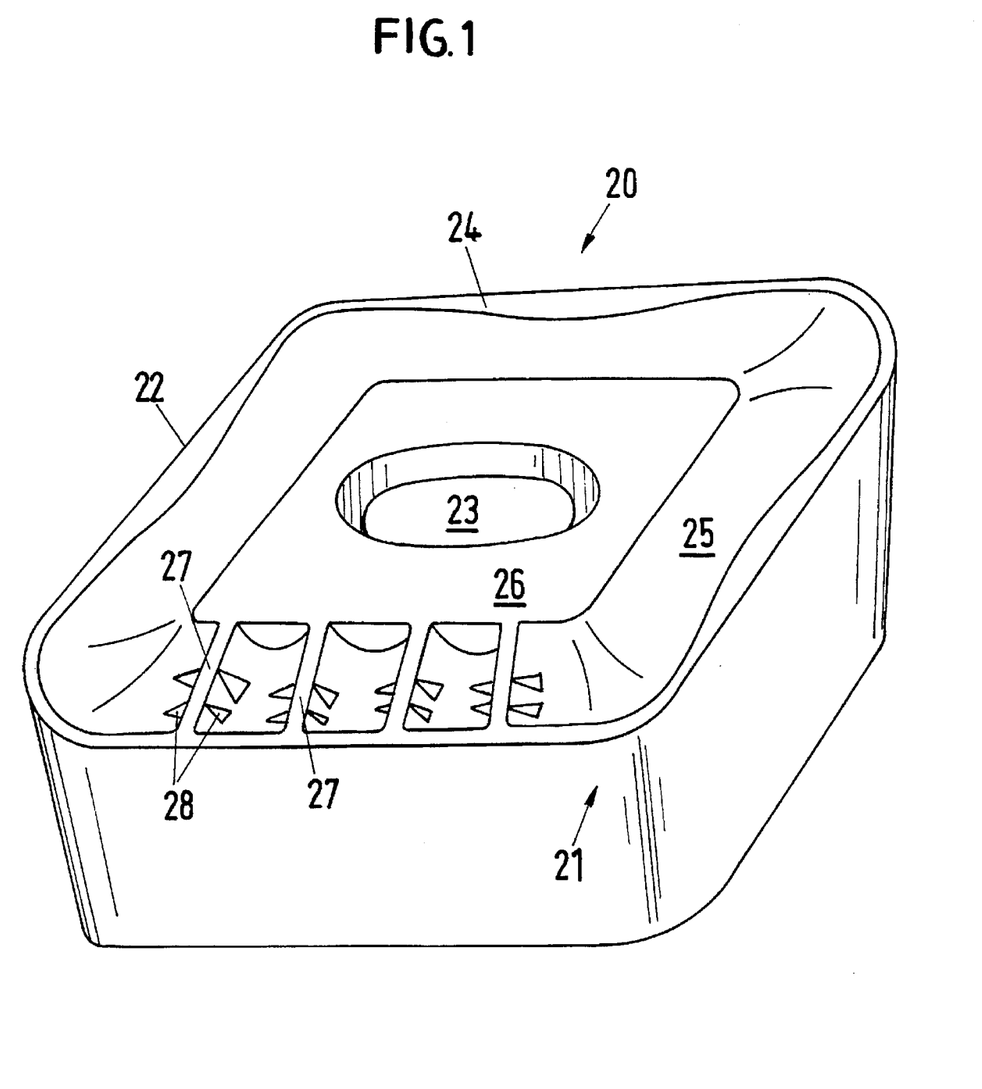
FIG. 1 a perspective view of a quadrilateral cutting insert with a chamfer, a chip-guiding groove, and a central plateau as well as longitudinal ridges and chip-guiding elements.

The cutting insert shown in FIG. 1 is formed as a quadrilateral and has four cutting corners 21 and cutting edges 22 joining them. A central mounting hole 23 serves for securing the cutting insert to a holder. Each cutting edge 22 of the cutting insert is delimited by a chamfer 24 which is either of uniform width or as shown here which widens toward the cutting-edge center. The chamfer can be set at a negative, 0°, or positive angle. The chamfer is delimited by a chip-guiding groove 25 which angles up to a central plateau 26. This plateau is raised relative to the cutting edges and the cutting corners. Longitudinal ridges 27 as well as transverse chip-guiding elements 28 run across and bridge the chip-guiding groove 25.

Figures 2A, 2B:
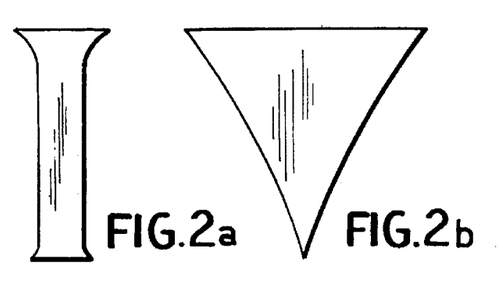
Figures 2D, 2E, 2F:
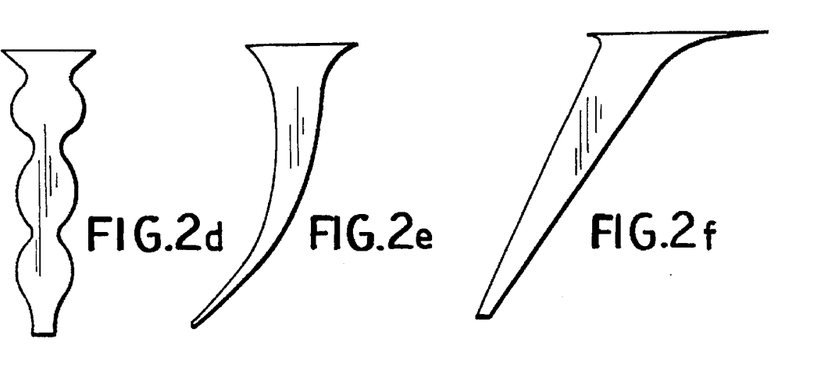
Figure 2G:
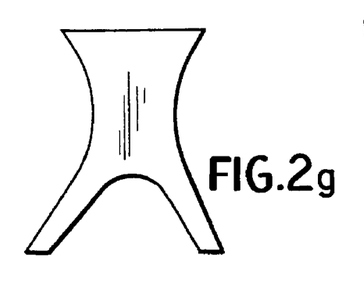
Figure 2H:
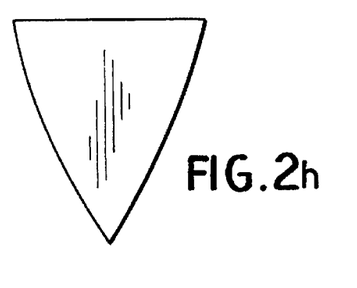

As can be seen in FIGS. 2a–2h the longitudinal ridges can have various shapes seen in plan view, namely columnar (FIG. 2a), triangularly concave (FIG. 2b), trapezoidal (FIG. 2c), with wavy edges (FIG. 2d), crescent shaped (FIG. 2e), generally trapezoidal but skew (FIG. 2f), concave with two diverging arms (FIG. 2g), or triangularly convex (FIG. 2h). Preferably the sharp-angled shapes of the longitudinal ridges are oriented such that the points are directed toward the cutting edge.

FIGS. 3a through 3e show further embodiments of the longitudinal-ridge comb. This can ether be planar (271), convex (272), concave (273), or wavy (274 or 275) with different amplitudes and curvature.

Figures 3A, 3B, 3C:
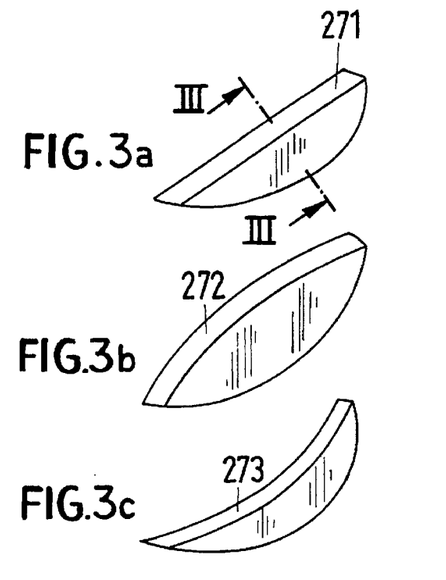
FIGS. 3a through 3e perspective views of variously shaped further longitudinal ridges and FIGS. 3f through 3i sections taken along line III—III of FIG. 3a (thus transverse to the longitudinal ridge)
Figure 3D:
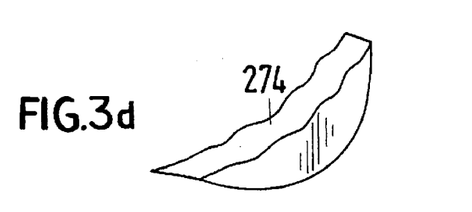
Figure 3E:
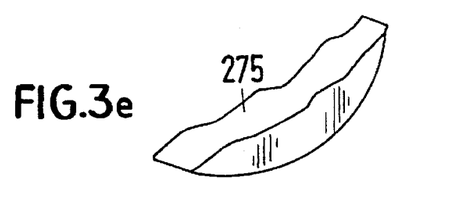
Figure 3F:
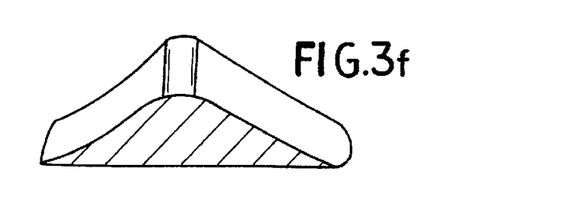
Figure 3G:
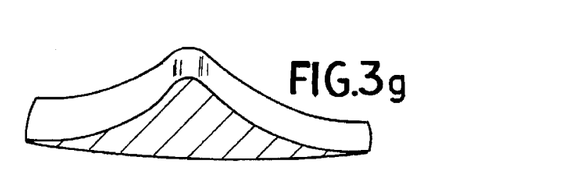
Figure 3H:
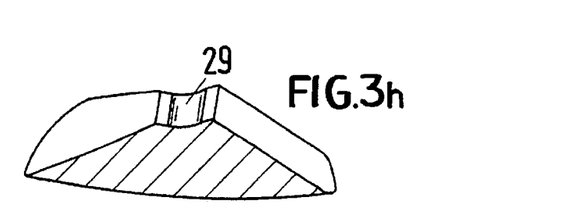
Figure 3I:
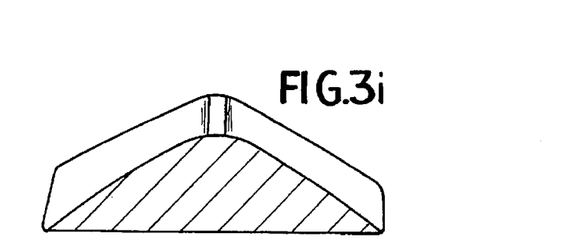

As can be seen from the sections taken along line III—III of FIG. 3a, the longitudinal ridge can have sides extending parallel to the cutting edge that are planar, convex, concave upwardly pointed, or formed by a thin or wide burr. The longitudinal-ridge comb can also be saddle-shaped (FIG. 3h) and formed with a recess 29.

Figure 4A:
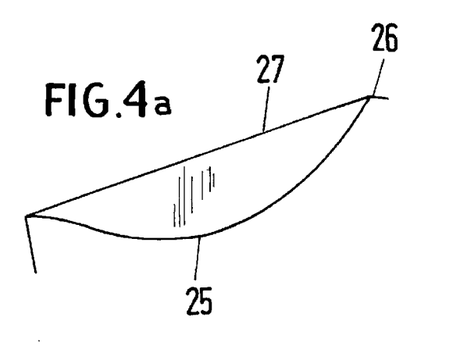
FIGS. 4a through 4e various schematic side views of longitudinal ridge shapes and chip-guiding grooves.
Figure 4B:
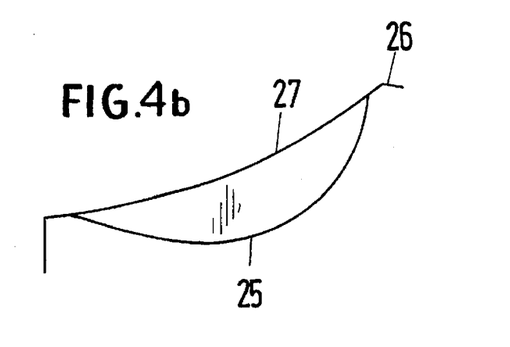

FIGS. 4a through 4e schematically shows side views of the relative positions of the longitudinal ridges relative to the chip-guiding groove 25. According to FIG. 4a a short chamfer is provided between the cutting edge and the chip-guiding groove 25. The longitudinal ridge 27 according to FIG. 4a ends directly in the region of the chamfer and extends to the edge of the rising flank of the chip-guiding groove to the plateau 26. The ridge 27 has according to FIG. 4a a generally straight shape. The longitudinal ridge 27 according to FIG. 4b is shaped slightly concave, opening generally in the transition region between the chamfer and the chip-guiding groove 25 in the front region of the cutting insert and generally in the edge of the ascending flank of the chip-guiding groove 25 to the plateau 26 in the back region.

Figure 4C:
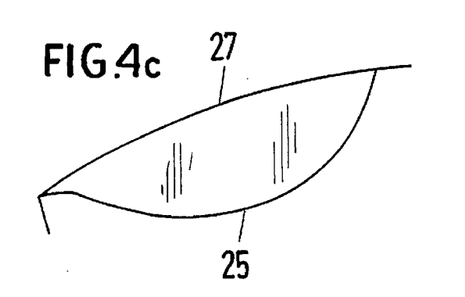
Figure 4D:
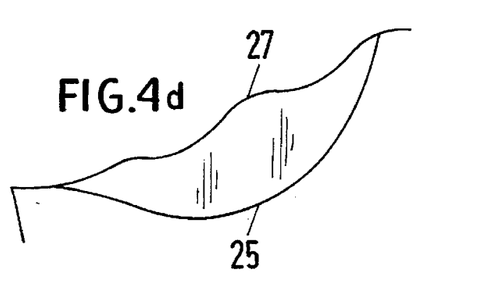
Figure 4E:
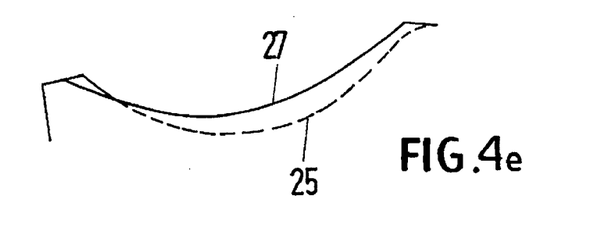

FIG. 4c shows a convex longitudinal ridge 27 which extends to the cutting edge 22. The longitudinal ridge 27 according to FIG. 4d has a wavy surface while the longitudinal ridge according to FIG. 4e is also shaped concave but such that it is formed as a groove in the front cutting-edge region in the chip-guiding groove 25 and the ridge 27 only projects in the central and back regions.

Figure 5A:
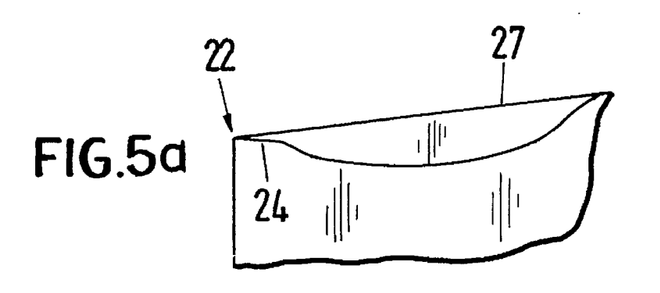
FIGS. 5a through 5e schematic views of sections of cutting inserts with views of various chip-guiding grooves and starting points of the longitudinal ridges.
Figure 5B:
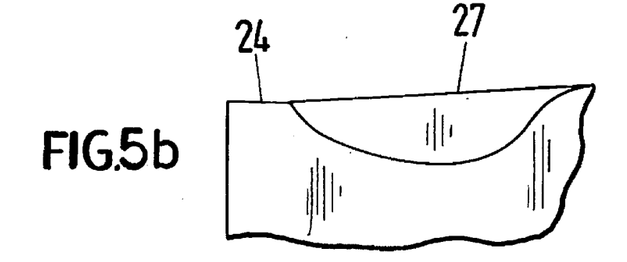
Figure 5C:
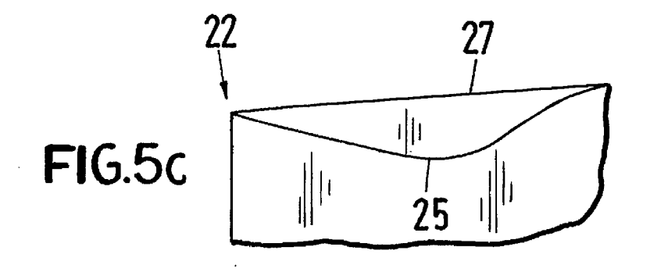
Figure 5D:
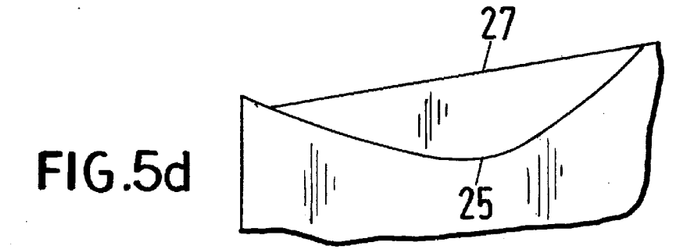
Figure 5E:
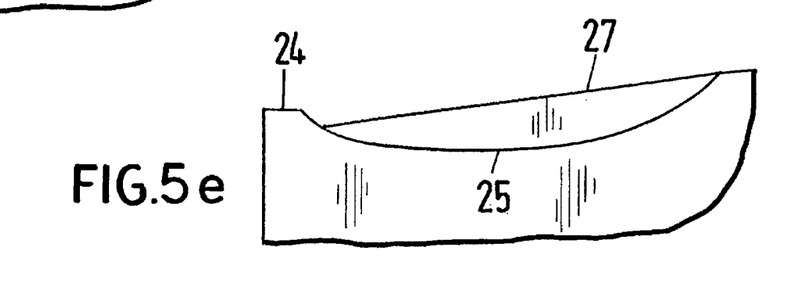

As is visible in FIGS. 5a through 5e, the longitudinal ridges can either run to the cutting edge 22 (FIGS. 5a and 5c), independently of whether a chamfer 24 is provided or the chip-guiding groove 24 is directly on the cutting edge (FIG. 5c). The longitudinal ridges can also extend at their front ends at the cutting edge 22 to the chamfer (FIG. 5b) or if there is no chamfer 24 into the descending flank of the chip-guiding groove 25 (FIG. 5d). FIG. 5e shows an embodiment where instead of a chamfer 24 the longitudinal ridge 27 extends to the descending-flank region of the chip-guiding groove 25.

Figure 6A:
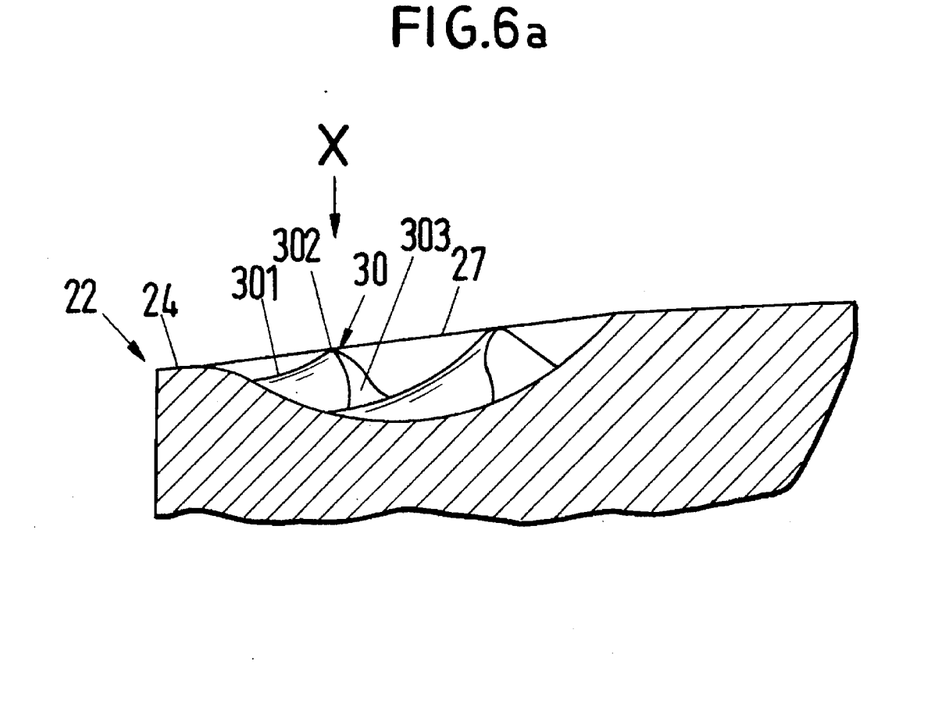
FIG. 6a a section through a further embodiment of the invention in the cutting-edge region.
Figure 6B:
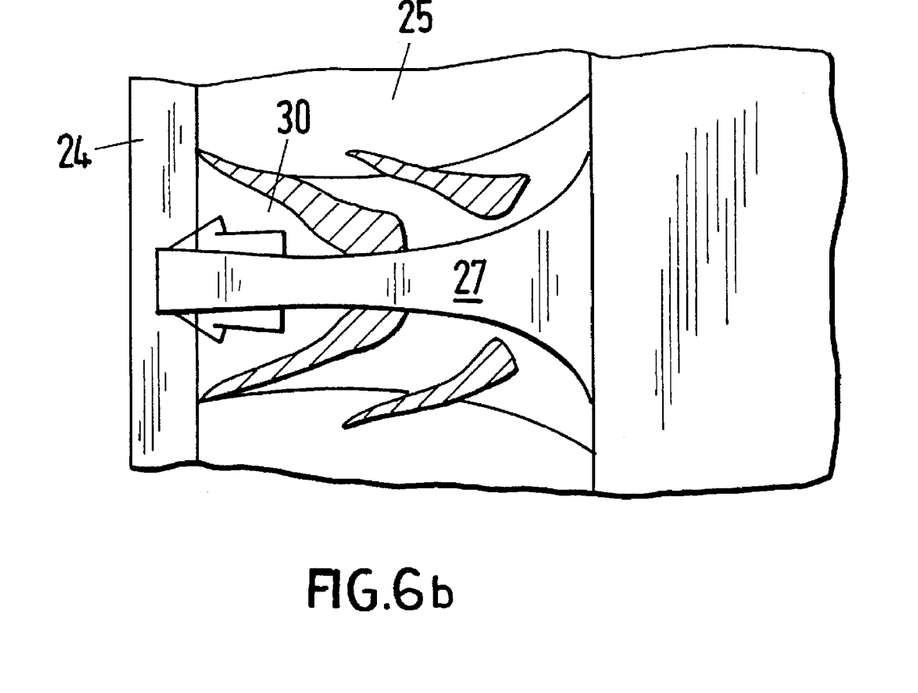
Figure 7A:
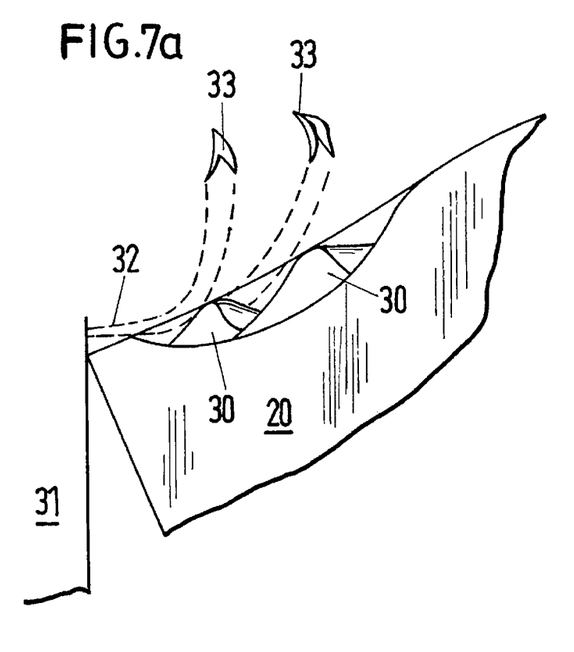
FIG. 7a a cutting insert according to the invention set in a tool insert, shown in a section.
Figure 7B:
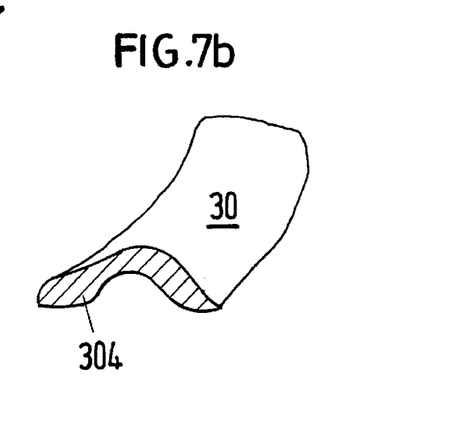

FIGS. 6a, 6b, 7a, 7b, 8a–8c and 9 show various embodiments of the chip-guiding elements 28 which all have in common that they have a part descending from the longitudinal ridge 27 to the base of the chip-guiding groove 25. The chip-guiding elements 30 according to FIGS. 6a and 6b have a ramp-shaped ascending surface 301 which rises to a crown point 302 from which it descends with a steep angle downward (surface 303) and connects to a lateral descending flank. The two chip-guiding elements which are arranged parallel to the ridge center axis one behind the other are of different heights so that their respective crown points are generally level with the longitudinal-ridge comb. A cutting insert according to FIGS. 6a and 6b is shown in FIG. 7a. Cutting a workpiece produces a chip 32 which slides back on the front or back chip-guiding element 30 which deflects it. The thus produced short chips 33 are shown symbolically. FIG. 7b shows a cross-section through a chip 32 with the hatched surface 304 representing the logical cross section through the produced chip.

Figure 8A:
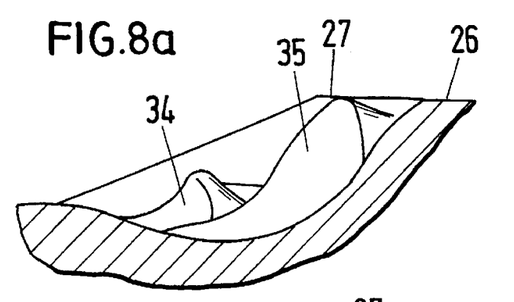
FIGS. 8a through 8f respective various views of embodiments according to the invention.
Figure 8B:
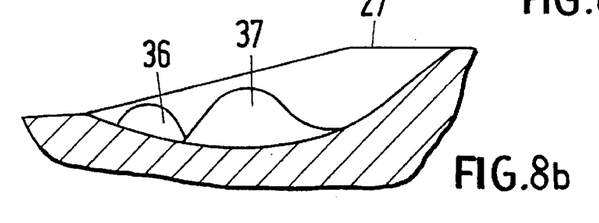
Figure 8C:
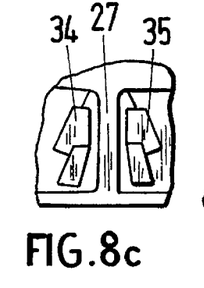
Figure 8D:
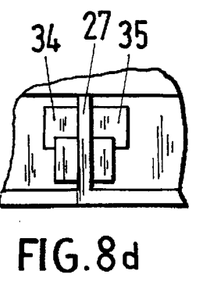

Further embodiments of various chip-guiding elements are seen in FIGS. 8a through 8f. The embodiment according to FIG. 8a has arranged one behind the other two fan-shaped chip-guiding elements 34 and 35 which are similar but of different sizes. Thus the chip-guiding element 35 ends level with the plateau 26 or with the longitudinal-ridge comb 27. FIGS. 8c and 8b to the right of FIG. 8a show possible cross-sectional shapes for the chip-guiding elements which are shovel- and fan-shaped, even if necessary trapezoidal, ball- or rib-shaped.

Figure 8E:
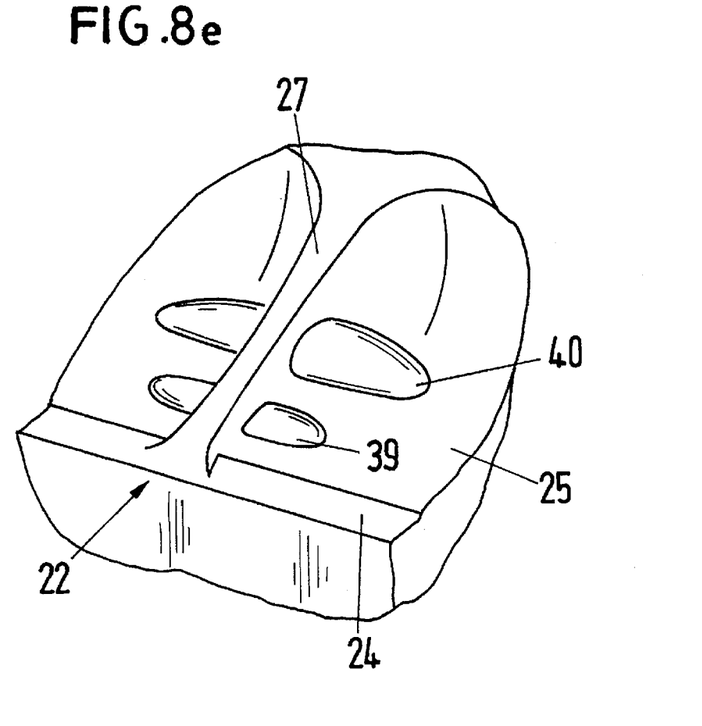

The chip-guiding elements 36 and 37 according to FIG. 8b are generally hemispherical while the chip-guiding elements 39 and 40 have the general shape of a half rotation ellipsoid cut through the longitudinal ridge 27 (FIG. 8e).

Figure 8F:
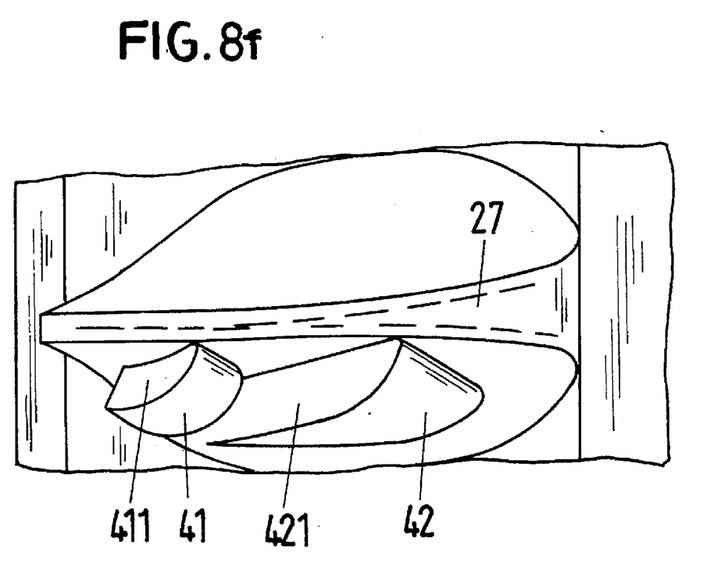

The chip-guiding elements 41 and 42 according to FIG. 8f are terraced and each have a shovel-like ascending surface 411 or 421 to an upper edge from which they descend sharply to the side and back. For clarity of view the chip-guiding elements 41 and 42 are left off on one side.

Figure 9:
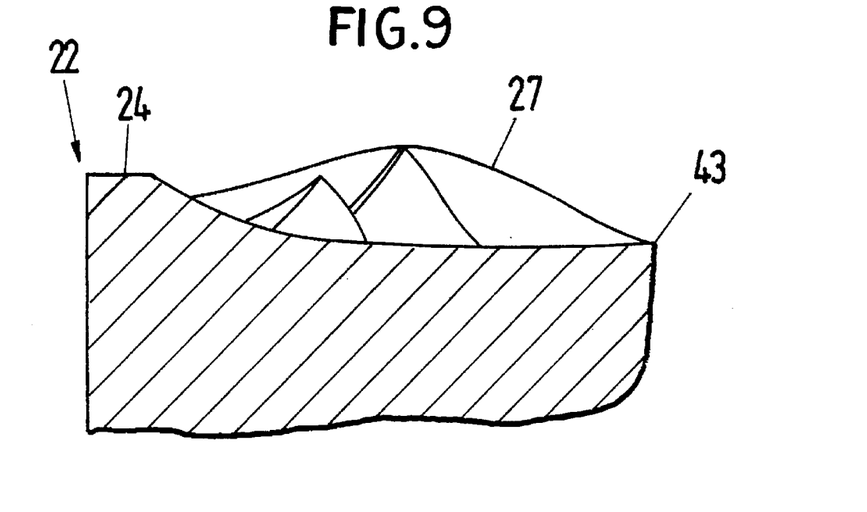
FIG. 9 a section of an embodiment of a cutting insert with a recessed middle part.
Figure 10A:
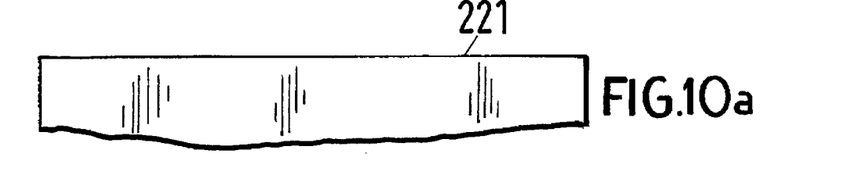
FIGS. 10a through 10d cutting inserts with different cutting-edge shapes in side view.
Figure 10B:
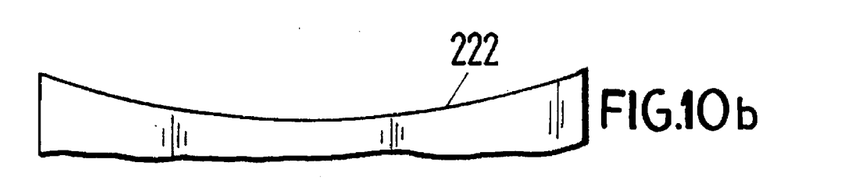
Figure 10C:
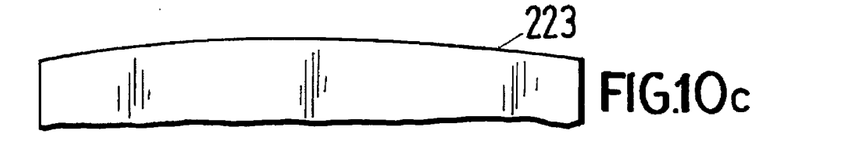
Figure 10D:
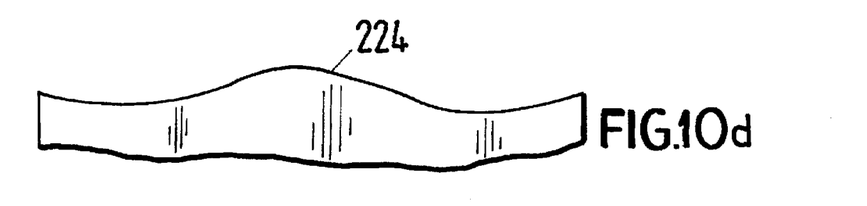

FIG. 9 shows a cutting insert with a depressed central part 43 so that the longitudinal ridges extend arcuately to the center of the cutting surface.

FIGS. 10a through 10d possible embodiments for the cutting edge 22, namely respective straight cutting edges 221, concave cutting edges 22, convex cutting edges 223, and wavy cutting edges 224. All the cutting edges, chip-guiding elements, longitudinal ridges, and cutting-plate types with or without raised or depressed central parts which are described above can be combined with one another.

I claim:

1. A cutting insert formed with
   a cutting edge;
   at least one chip-guiding groove defining a central part offset back from the cutting edge;
   raised longitudinal ridges in the groove directed generally perpendicular to the cutting edge and at least partly bridging the chip-guiding groove; and
   additional chip-guiding ribs in the groove extending from the ridges transverse to the respective longitudinal ridges.

2. The cutting insert according to claim 1 wherein a chamfer is provided between the cutting edge and the chip-guiding groove.

3. The cutting insert according to claim 1 wherein each longitudinal ridge extends to the central part.

4. The cutting insert according to claim 1 wherein each longitudinal ridge has a crest that is formed planar, convex, concave, or wavy or is generally straight.

5. The cutting insert according to claim 4 wherein each longitudinal ridge extends to a descending flank of the chip-guiding groove.

6. The cutting insert according to claim 1 wherein each longitudinal ridge is pointed toward the cutting edge.

7. The cutting insert according to claim 1 wherein each longitudinal ridge has a laterally arcuately dropping flank.

8. The cutting insert according to claim 7 wherein the flanks are formed convex, concave, or wavy.

9. The cutting insert according to claim 1 wherein each longitudinal ridge has a burr-shaped, planar, or centrally slightly recessed crest.

10. The cutting insert according to claim 1 wherein the central part is raised.

11. The cutting insert according to claim 1 wherein the central part is depressed.

12. The cutting insert according to claim 1 wherein the chip-guiding ribs are at most as high as the longitudinal ridges.

13. The cutting insert according to claim 1 wherein two or more such chip-guiding ribs are arranged one behind the other spaced along the respective ridge.

14. The cutting insert according to claim 13 wherein each chip-guiding rib farther from the cutting edge is bigger than the one in front of it.

15. The cutting insert according to claim 1 wherein at least two chip-guiding ribs are arranged to both sides of each longitudinal ridge and the chip-guiding ribs each have a leading ramp-shaped ascending surface, a laterally descending side flank, and a rearwardly descending back flank which descend laterally and backwardly at a steeper angle to the side turned away from the cutting edge than a ramp angle of the leading surface.

16. The cutting insert according to claim 15 wherein the side flank has an edge shaped wavy toward the back flank.

17. The cutting insert according to claim 15 wherein the backwardly descending flank extends in the region of the immediately following ramp-shaped ascending flank.

18. The cutting insert according to claim 15 wherein a base-surface width of each ascending flank in the same row is the same size or the ascending surface decreases with increasing height.

19. The cutting insert according to claim 1 wherein the chip-guiding ribs extend to both sides of and preferably symmetrically to the respective longitudinal ridge.

20. The cutting insert according to claim 19 wherein the transverse ribs are each a quarter of a rotation ellipsoid.

21. The cutting insert according to claim 19 wherein the ribs each have a maximum transverse-rib height or length or width that increases with spacing from the cutting edge.

22. The cutting insert according to claim 1 wherein the chip-guiding ribs are formed in cross section of fan or trapezoidal shape.

23. The cutting insert according to claim 22 wherein the trapezoidal chip-guiding ribs have convex ascending and descending flanks.

24. The cutting insert according to claim 22 wherein the chip-guiding ribs each have a convex side flank which widens and is arcuately round or pointed where it meets the respective longitudinal ridge.

25. The cutting insert according to claim 1 wherein the chip-guiding ribs are shaped in cross section as right-angle shovel shapes.

26. The cutting insert according to claim 1 wherein the chip-guiding ribs are terraced one behind the other with each chip-guiding rib having an ascending flank with a tongue-shaped surface with an arcuate edge that defines a throughgoing, descending, and lateral flank.

27. A cutting insert formed with
   a cutting edge;
   at least one chip-guiding groove defining a central part offset back from the cutting edge;
   raised longitudinal ridges in the groove directed generally perpendicular to the cutting edge and at least partly bridging the chip-guiding groove; and
   at least two chip-guiding ribs in the groove extending from respective longitudinal sides of each of the ridges transverse to the respective longitudinal ridges.

* * * * *